(12) United States Patent
Fürst et al.

(10) Patent No.: US 11,172,312 B2
(45) Date of Patent: Nov. 9, 2021

(54) ACOUSTIC ACTIVITY DETECTING MICROPHONE

(71) Applicant: Knowles Electronics, LLC, Itasca, IL (US)

(72) Inventors: Claus Erdmann Fürst, Roskilde (DK); Henrik Thomsen, Holte (DK); Michael Deruginsky, Hillerød (DK); Dibyendu Nandy, Naperville, IL (US); Oddy Nopporn Khamharn, Addison, IL (US); Aziz Yurttas, Copenhagen (DK); Svetoslav Radoslavov Gueorguiev, Copenhagen (DK); Anders Mortensen, Koge (DK)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 16/752,673

(22) Filed: Jan. 26, 2020

(65) Prior Publication Data

US 2020/0162823 A1 May 21, 2020

Related U.S. Application Data

(63) Continuation of application No. 16/020,932, filed on Jun. 27, 2018, now abandoned, which is a
(Continued)

(51) Int. Cl.
*H04R 17/02* (2006.01)
*G10L 15/00* (2013.01)
(Continued)

(52) U.S. Cl.
CPC ............ *H04R 17/02* (2013.01); *G06F 1/325* (2013.01); *G06F 1/3206* (2013.01);
(Continued)

(58) Field of Classification Search
CPC ............ H04R 17/02; H04R 2201/003; H04R 2460/03; H04R 2499/11; H04R 1/08;
(Continued)

(56) References Cited

U.S. PATENT DOCUMENTS 3,989,897 A 11/1976 Carver
4,811,404 A 3/1989 Vilmur et al.
(Continued)

FOREIGN PATENT DOCUMENTS

CN 1083639 A 3/1994
CN 1306472 A 8/2001
(Continued)

OTHER PUBLICATIONS

Anonymous, "dsPIC30F Digital Signal Controllers," retrieved from http://ww1.microchip.com/downloads/en/DeviceDoc/dspbrochure_70095G.pdf, XP055487946, pp. 1-20 (Oct. 31, 2004).

*Primary Examiner* — William A Jerez Lora
(74) *Attorney, Agent, or Firm* — Foley & Lardner LLP

(57) ABSTRACT

The present disclosure relates generally to a microphone assembly. The microphone assembly has an acoustic activity detection mode of operation when the electrical circuit is clocked using an internal clock signal generator in the absence of an external clock signal at a host interface, and an electrical circuit of the microphone assembly is configured to provide an interrupt signal to the host interface upon detection of acoustic activity by the electrical circuit. The electrical circuit is configured to control the operating mode of the microphone assembly based on a frequency of the external clock signal in response to providing the interrupt signal and is configured to provide data representing the electrical signal to the host interface using the external clock signal received at the host interface.

20 Claims, 6 Drawing Sheets

Related U.S. Application Data continuation-in-part of application No. 14/512,846, filed on Oct. 13, 2014, now Pat. No. 10,028,054, said application No. 16/020,932 is a continuation-in-part of application No. 14/824,736, filed on Aug. 12, 2015, now Pat. No. 10,313,796, which is a continuation of application No. 14/522,158, filed on Oct. 23, 2014, now Pat. No. 9,113,263, which is a continuation of application No. 14/282,101, filed on May 20, 2014, now Pat. No. 9,712,923.

(60) Provisional application No. 61/893,453, filed on Oct. 21, 2013, provisional application No. 61/826,587, filed on May 23, 2013.

(51) Int. Cl.
  *G06F 1/3234* (2019.01)
  *H04R 19/00* (2006.01)
  *H04R 1/08* (2006.01)
  *H04R 3/00* (2006.01)
  *H04R 19/04* (2006.01)
  *G06F 1/3206* (2019.01)
  *G06F 1/3215* (2019.01)
  *G10L 25/78* (2013.01)
  *G06F 1/324* (2019.01)

(52) U.S. Cl.
  CPC ............ *G06F 1/3215* (2013.01); *G10L 15/00* (2013.01); *H04R 1/08* (2013.01); *H04R 3/00* (2013.01); *H04R 19/005* (2013.01); *H04R 19/04* (2013.01); *G06F 1/324* (2013.01); *G10L 25/78* (2013.01); *H04R 2201/003* (2013.01); *H04R 2460/03* (2013.01); *H04R 2499/11* (2013.01); *Y02D 10/00* (2018.01)

(58) Field of Classification Search
  CPC ........ H04R 3/00; H04R 19/005; H04R 19/04; G06F 1/3206; G06F 1/3215; G06F 1/325; G06F 1/324; G10L 15/00; G10L 25/78; Y02D 10/00
  USPC .............................. 381/91, 98, 111, 122, 144
  See application file for complete search history.

(56) References Cited

U.S. PATENT DOCUMENTS

| | | |
|---|---|---|
| 4,812,996 A | 3/1989 | Stubbs |
| 4,831,558 A | 5/1989 | Shoup et al. |
| 5,012,519 A | 4/1991 | Adlersberg et al. |
| 5,335,312 A | 8/1994 | Mekata et al. |
| 5,340,316 A | 8/1994 | Javkin et al. |
| 5,473,702 A | 12/1995 | Yoshida et al. |
| 5,555,287 A | 9/1996 | Gulick et al. |
| 5,675,808 A | 10/1997 | Gulick et al. |
| 5,819,219 A | 10/1998 | De Vos et al. |
| 5,822,598 A | 10/1998 | Lam |
| 5,828,997 A | 10/1998 | Durlach et al. |
| 5,886,656 A | 3/1999 | Feste et al. |
| 6,057,791 A | 5/2000 | Knapp |
| 6,070,140 A | 5/2000 | Tran |
| 6,081,143 A * | 6/2000 | Ho .......................... G06F 1/12 327/166 |
| 6,138,101 A | 10/2000 | Fujii |
| 6,154,721 A | 11/2000 | Sonnic |
| 6,249,757 B1 | 6/2001 | Cason |
| 6,259,291 B1 | 7/2001 | Huang |
| 6,381,570 B2 | 4/2002 | Li et al. |
| 6,397,186 B1 | 5/2002 | Bush et al. |
| 6,449,586 B1 | 9/2002 | Hoshuyama |
| 6,483,923 B1 | 11/2002 | Marash |
| 6,594,367 B1 | 7/2003 | Marash et al. |
| 6,756,700 B2 | 6/2004 | Zeng |
| 6,829,244 B1 | 12/2004 | Wildfeuer et al. |
| 6,853,733 B1 * | 2/2005 | Groothedde .......... H04R 1/005 381/111 |
| 6,876,859 B2 | 4/2005 | Anderson et al. |
| 7,102,452 B1 | 9/2006 | Holmes |
| 7,190,038 B2 | 3/2007 | Dehe et al. |
| 7,319,959 B1 | 1/2008 | Watts |
| 7,346,176 B1 | 3/2008 | Bernardi et al. |
| 7,373,293 B2 | 5/2008 | Chang et al. |
| 7,415,416 B2 | 8/2008 | Rees |
| 7,473,572 B2 | 1/2009 | Dehe et al. |
| 7,539,273 B2 | 5/2009 | Struckman |
| 7,546,498 B1 | 6/2009 | Tang et al. |
| 7,619,551 B1 | 11/2009 | Wu |
| 7,630,504 B2 | 12/2009 | Poulsen |
| 7,774,204 B2 | 8/2010 | Mozer et al. |
| 7,781,249 B2 | 8/2010 | Laming et al. |
| 7,795,695 B2 | 9/2010 | Weigold et al. |
| 7,825,484 B2 | 11/2010 | Martin et al. |
| 7,829,961 B2 | 11/2010 | Hsiao |
| 7,856,283 B2 | 12/2010 | Burk et al. |
| 7,856,804 B2 | 12/2010 | Laming et al. |
| 7,873,114 B2 | 1/2011 | Lin |
| 7,903,831 B2 | 3/2011 | Song |
| 7,957,542 B2 | 6/2011 | Sarrukh et al. |
| 7,957,972 B2 | 6/2011 | Huang et al. |
| 7,986,794 B2 | 7/2011 | Zhang |
| 8,005,238 B2 | 8/2011 | Tashev et al. |
| 8,111,843 B2 | 2/2012 | Logalbo et al. |
| 8,112,272 B2 | 2/2012 | Nagahama et al. |
| 8,155,346 B2 | 4/2012 | Yoshizawa et al. |
| 8,184,822 B2 | 5/2012 | Carreras et al. |
| 8,184,823 B2 | 5/2012 | Itabashi et al. |
| 8,204,253 B1 | 6/2012 | Solbach |
| 8,274,856 B2 | 9/2012 | Byeon |
| 8,275,148 B2 | 9/2012 | Li et al. |
| 8,447,045 B1 | 5/2013 | Laroche |
| 8,538,035 B2 | 9/2013 | Every et al. |
| 8,606,571 B1 | 12/2013 | Every et al. |
| 8,666,751 B2 | 3/2014 | Murthi et al. |
| 8,712,776 B2 | 4/2014 | Bellegarda et al. |
| 8,958,572 B1 | 2/2015 | Solbach |
| 8,972,252 B2 | 3/2015 | Hung et al. |
| 8,996,381 B2 | 3/2015 | Mozer et al. |
| 9,043,211 B2 | 5/2015 | Haiut et al. |
| 9,111,548 B2 | 8/2015 | Nandy et al. |
| 9,112,984 B2 | 8/2015 | Sejnoha et al. |
| 2002/0106092 A1 | 8/2002 | Matsuo |
| 2002/0123456 A1 | 9/2002 | Glass |
| 2002/0138265 A1 | 9/2002 | Stevens et al. |
| 2003/0095667 A1 | 5/2003 | Watts |
| 2003/0138061 A1 | 7/2003 | Li |
| 2003/0171907 A1 | 9/2003 | Gal-On et al. |
| 2005/0060155 A1 | 3/2005 | Chu et al. |
| 2005/0171851 A1 | 8/2005 | Applebaum et al. |
| 2005/0207605 A1 | 9/2005 | Dehe et al. |
| 2006/0013415 A1 | 1/2006 | Winchester |
| 2006/0074658 A1 | 4/2006 | Chadha |
| 2006/0074693 A1 | 4/2006 | Yamashita |
| 2006/0164151 A1 | 7/2006 | Chatterjee et al. |
| 2007/0053522 A1 | 3/2007 | Murray et al. |
| 2007/0076896 A1 | 4/2007 | Hosaka et al. |
| 2007/0088544 A1 | 4/2007 | Acero et al. |
| 2007/0127761 A1 | 6/2007 | Poulsen |
| 2007/0154031 A1 | 7/2007 | Avendano et al. |
| 2007/0253574 A1 | 11/2007 | Soulodre |
| 2007/0274297 A1 | 11/2007 | Cross et al. |
| 2007/0278501 A1 | 12/2007 | MacPherson et al. |
| 2008/0019548 A1 | 1/2008 | Avendano |
| 2008/0147397 A1 | 6/2008 | Konig et al. |
| 2008/0170716 A1 | 7/2008 | Zhang |
| 2008/0175425 A1 | 7/2008 | Roberts et al. |
| 2008/0195389 A1 | 8/2008 | Zhang et al. |
| 2008/0232607 A1 | 9/2008 | Tashev et al. |
| 2008/0260175 A1 | 10/2008 | Elko |
| 2008/0267431 A1 | 10/2008 | Leidl et al. |
| 2008/0279407 A1 | 11/2008 | Pahl |
| 2008/0283942 A1 | 11/2008 | Huang et al. |

(56) References Cited

U.S. PATENT DOCUMENTS

| | | |
|---|---|---|
| 2009/0001553 A1 | 1/2009 | Pahl et al. |
| 2009/0003629 A1 | 1/2009 | Shajaan et al. |
| 2009/0012783 A1 | 1/2009 | Klein |
| 2009/0012786 A1 | 1/2009 | Zhang et al. |
| 2009/0022335 A1 | 1/2009 | Konchitsky et al. |
| 2009/0024392 A1 | 1/2009 | Koshinaka |
| 2009/0055170 A1 | 2/2009 | Nagahama |
| 2009/0067642 A1 | 3/2009 | Buck et al. |
| 2009/0146848 A1 | 6/2009 | Ghassabian |
| 2009/0164212 A1 | 6/2009 | Chan et al. |
| 2009/0175466 A1 | 7/2009 | Elko et al. |
| 2009/0180655 A1 | 7/2009 | Tien et al. |
| 2009/0234645 A1 | 9/2009 | Bruhn |
| 2009/0257289 A1 | 10/2009 | Byeon |
| 2009/0304203 A1 | 12/2009 | Haykin et al. |
| 2009/0316935 A1 | 12/2009 | Furst et al. |
| 2009/0323982 A1 | 12/2009 | Solbach et al. |
| 2010/0046780 A1 | 2/2010 | Song |
| 2010/0052082 A1 | 3/2010 | Lee et al. |
| 2010/0082346 A1 | 4/2010 | Rogers et al. |
| 2010/0082349 A1 | 4/2010 | Bellegarda et al. |
| 2010/0121629 A1 | 5/2010 | Cohen |
| 2010/0128914 A1 | 5/2010 | Khenkin |
| 2010/0135508 A1 | 6/2010 | Wu |
| 2010/0183181 A1 | 7/2010 | Wang |
| 2010/0246877 A1 | 9/2010 | Wang et al. |
| 2010/0290644 A1 | 11/2010 | Wu et al. |
| 2010/0322443 A1 | 12/2010 | Wu et al. |
| 2010/0322451 A1 | 12/2010 | Wu et al. |
| 2010/0324894 A1 | 12/2010 | Potkonjak |
| 2011/0013787 A1 | 1/2011 | Chang |
| 2011/0026739 A1 | 2/2011 | Thomsen et al. |
| 2011/0038489 A1 | 2/2011 | Visser et al. |
| 2011/0064242 A1 | 3/2011 | Parikh et al. |
| 2011/0075875 A1 | 3/2011 | Wu et al. |
| 2011/0099010 A1 | 4/2011 | Zhang |
| 2011/0103626 A1 | 5/2011 | Bisgaard et al. |
| 2011/0107010 A1 | 5/2011 | Strauss et al. |
| 2011/0164761 A1 | 7/2011 | McCowan |
| 2011/0170714 A1 | 7/2011 | Hanzlik et al. |
| 2011/0218805 A1 | 9/2011 | Washio et al. |
| 2011/0274291 A1 | 11/2011 | Tashev et al. |
| 2011/0293115 A1 | 12/2011 | Henriksen |
| 2011/0299695 A1 | 12/2011 | Nicholson |
| 2012/0027218 A1 | 2/2012 | Every et al. |
| 2012/0112804 A1 | 5/2012 | Li et al. |
| 2012/0113899 A1 | 5/2012 | Overmars |
| 2012/0177227 A1 | 7/2012 | Adachi |
| 2012/0232896 A1 | 9/2012 | Taleb et al. |
| 2012/0250910 A1* | 10/2012 | Shajaan .................. H04R 3/00 381/174 |
| 2012/0310641 A1 | 12/2012 | Niemisto et al. |
| 2013/0029684 A1 | 1/2013 | Kawaguchi et al. |
| 2013/0035777 A1 | 2/2013 | Niemisto et al. |
| 2013/0058495 A1 | 3/2013 | Furst et al. |
| 2013/0195291 A1 | 8/2013 | Josefsson |
| 2013/0197920 A1 | 8/2013 | Lesso et al. |
| 2013/0223635 A1 | 8/2013 | Singer et al. |
| 2013/0289988 A1 | 10/2013 | Fry |
| 2013/0289996 A1 | 10/2013 | Fry |
| 2013/0322461 A1 | 12/2013 | Poulsen |
| 2014/0163978 A1 | 6/2014 | Basye et al. |
| 2014/0244269 A1 | 8/2014 | Tokutake |
| 2014/0244273 A1 | 8/2014 | Laroche et al. |
| 2014/0257821 A1 | 9/2014 | Adams et al. |
| 2014/0270260 A1 | 9/2014 | Goertz et al. |
| 2014/0274203 A1 | 9/2014 | Ganong et al. |
| 2014/0278435 A1 | 9/2014 | Ganong et al. |
| 2014/0281628 A1 | 9/2014 | Nigam et al. |
| 2014/0316783 A1 | 10/2014 | Medina |
| 2014/0343949 A1 | 11/2014 | Huang et al. |
| 2014/0348345 A1 | 11/2014 | Furst et al. |
| 2015/0030163 A1 | 1/2015 | Sokolov |
| 2015/0106085 A1 | 4/2015 | Lindahl |
| 2015/0112690 A1 | 4/2015 | Guha et al. |
| 2015/0134331 A1 | 5/2015 | Millet et al. |

FOREIGN PATENT DOCUMENTS

| | | |
|---|---|---|
| CN | 1868118 A | 11/2006 |
| CN | 101288337 A | 10/2008 |
| CN | 102077274 A | 5/2011 |
| CN | 102224675 A | 10/2011 |
| CN | 1022224675.5 A | 10/2011 |
| CN | 102272826 A | 12/2011 |
| CN | 102340722 A | 2/2012 |
| CN | 102568480 A | 7/2012 |
| CN | 102770909 A | 11/2012 |
| CN | 102983868 A | 3/2013 |
| CN | 103117065 A | 5/2013 |
| CN | 103811007 A | 5/2014 |
| DE | 11 2011 105 791 | 8/2014 |
| WO | WO-90/13890 A1 | 11/1990 |
| WO | WO-02/03747 A2 | 1/2002 |
| WO | WO-02/061727 | 8/2002 |
| WO | WO-2005/009072 A2 | 1/2005 |
| WO | WO-2007/009465 A2 | 1/2007 |
| WO | WO-2010/060892 A1 | 6/2010 |
| WO | WO-2014/189931 A1 | 11/2014 |

* cited by examiner

ACOUSTIC ACTIVITY DETECTING MICROPHONE

CROSS REFERENCE TO RELATED APPLICATIONS

This patent application is a continuation of U.S. application Ser. No. 16/020,932 filed on 27 Jun. 2018, which is a continuation in part of U.S. application Ser. No. 14/824,736 filed on 12 Aug. 2015, which is a continuation of Ser. No. 14/522,158 filed on 23 Oct. 2014, which is a continuation of Ser. No. 14/282,101 filed on 20 May 2014, which claims benefit to U.S. Provisional Application No. 61/826,587 filed on 23 May 2013, all of which are entitled "VAD detection Microphone and Method of Operating the Same." This patent application is also a continuation in part of U.S. application Ser. No. 14/512,846 filed on 13 Oct. 2014, which claims benefit to U.S. Provisional Application No. 61/893,453 filed on 21 Oct. 2013, both of which are entitled "Apparatus and Method For Frequency Detection." The entire contents of each of these priority applications are incorporated herein by reference.

TECHNICAL FIELD

This application relates to microphones and more specifically to acoustic activity detection by such microphones and methods therefor.

BACKGROUND

Microphones are used to detect voice signals and other acoustic activity. Once obtained, the signal can be processed in a number of different ways. A wide variety of functions can be provided by today's microphones and they can interface with and utilize a variety of different algorithms. Some microphones are composed of a microelectromechanical systems (MEMS) transducer or sensor that generates an electrical signal in response to acoustic input and an integrated circuit that processes the electrical signal.

Voice triggering, for example, as used in mobile communication devices is an increasingly popular feature. In such devices, a user may wish to speak commands into a mobile device and have the device react in response to the commands. In these cases, a programmable digital signal processor (DSP) will first use a voice activity detection algorithm to detect if there is voice in an audio signal captured by a microphone, and then, subsequently, analysis is performed on the signal to predict the spoken word in the received audio signal. Various voice activity detection (VAD) approaches have been developed and deployed in various types of devices such as cellular phone and personal computers.

In the use of these approaches, power consumption becomes a concern. Lower power consumption gives longer standby time. For today's smart-phones (in particular), the use of power is a key parameter. Unfortunately, present approaches of operating microphones use and waste much power. This has resulted in user dissatisfaction with these previous approaches and systems.

BRIEF DESCRIPTION OF THE DRAWINGS

For a more complete understanding of the disclosure, reference should be made to the following detailed description and accompanying drawings wherein.

Figure 1:
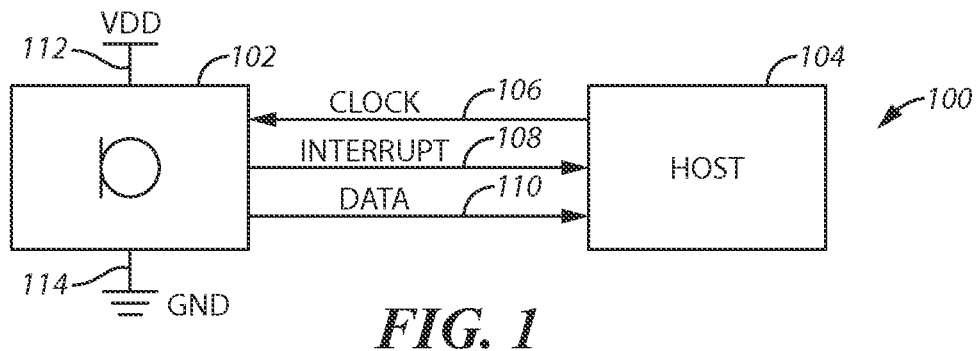
FIG. 1 comprises a block diagram of a system with a microphone that uses a VAD algorithm and includes power savings features.

Skilled artisans will appreciate that elements in the figures are illustrated for simplicity and clarity. It will be further appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

The present approaches change the way that present mobile systems are partitioned, the functionality of the microphone, and the modes in which it can operate. In these regards, a microphone with a voice or event detection block is presented and this enables the microphone to generate an interrupt signal which can wake the system up.

In some aspects, the microphones described herein include five external connections. The first connection may be a power connection and the second connection may be a ground connection. The third, fourth, and fifth connections are connections from the microphone to a host device (e.g., host circuitry in the device in which the microphone resides). More specifically, the third connection may be a data connection, the fourth connection may be an interrupt (sent from the microphone to the host), and the fifth connection may be a clock signal (sent from the host to the microphone).

The microphone may have several modes of operation and these are controlled by a clock signal. The host receives a data signal from the microphone as well as an interrupt signal. The host has multiple power modes controlled by the interrupt signal generated by the microphone. The host generates the clock signal for the microphone and thereby controls the mode of operation of the microphone. In one example, the absence of a clock causes the microphone to enter voice activity detection (VAD) mode.

In one example, the microphone includes a VAD mode of operation. In this mode of operation, the microphone has a very low power consumption, and it runs on a relatively low clock frequency which can be supplied either externally (from the host) or from an on-chip oscillator.

This operation enables very low power consumption levels as only the most necessary signal processing is active during this mode. In one aspect, the analog signal processing blocks of the microphone (such as the microphone preamplifier, the analog to digital converter, the voltage regulators and the charge pump supplying the bias voltage for the microelectromechanical systems (MEMS) microphone) operate at lower power. In this mode, these blocks are operated at reduced power enough for achieving the bandwidth and signal to noise ratio (SNR) needed for the VAD or event detector to function. For example, a bandwidth of operation of approximately 8 kHz after decimation and an SNR of approximately 60 dB can be achieved.

The VAD or event detector can be implemented using well known techniques. For example, short term energy measures vs. long term energy measures, zero crossing and so forth can be used to detect voice signals.

It should also be noted that the interface (the connections between the host and the microphone) is not limited to the exact signals described herein. In these regards, other signals or other combinations of signals may be used. The physical implementation of the interface may also vary. For example, it may be a single physical bi-directional line, or multiple uni-directional lines.

In other aspects, the microphone further includes a delay buffer. Audio data is sequentially written to the buffer. In other examples, upon wake up, buffered data is transmitted over a first transmission line and real-time data is transmitted simultaneously over a second and separate output line. In still other examples, buffered data is flushed or discarded upon switching modes.

In still other aspects, the microphone is over-clocked to catch up buffered data to real-time data. The microphone can also be used for multi-microphone voice triggered applications. In one example, the microphone wakes up and enables data synchronizations of a second microphone either in a buffered or a real-time mode.

Approaches are provided that implement a multimode microphone, where the microphone works in multiple modes and, at the same time, current consumption (and power usage) of the microphone follows the frequency of the input clock.

In many of these embodiments, the frequency of the input clock is compared to an internally generated clock signal. The frequency of the input clock is indicative of the operational mode of an application specific integrated circuit (ASIC) or other device. The comparison allows for accurate detection of the input frequency. The current provided to different operational blocks of the ASIC can be changed based upon the frequency (which now has been measured accurately). In other words, the current (or power) consumption of the ASIC (or portions of the ASIC) follows the frequency change of the input clock. Additional, different operation modes dependent on the frequency of the input clock are followed and their specific current and power needs are addressed because of the flexibility of changing the current according to these approaches.

In other aspects, the internal oscillator signal (from the ASIC) is temperature compensated for its frequency. In still other aspects and to reduce the design complexity, the internal oscillator signal (from the ASIC) is not process compensated for frequency, but rather the process compensation is performed during manufacturing test of the ASIC, where trim test for process compensation is done and then the trim value is stored to One Time Programmable (OTP) memory.

The current consumption values for a given operational mode or frequency is determined by the requirements on noise and current consumption. In these regards, noise is also a parameter that is considered and controlled, as there is a well-known relation between noise and current consumption in analog mixed-mode integrated circuit (IC) design.

In many of these embodiments, an application specific integrated circuit (ASIC) is coupled to an acoustic device. The ASIC includes at least one operational block and a frequency detection block. The frequency detection block is configured to receive an input clock signal, determine the frequency of the input clock signal, the frequency indicative of one of a plurality of operational modes of the ASIC. The frequency detection block is further configured to based upon the determined frequency, change an amount current provided to the at least one operational block.

In other aspects, the frequency detection block compares the input clock to an internally generated clock signal that runs independently of temperature and process. In other examples, the acoustic device is a micro-electro-mechanical system (MEMS) microphone.

In some examples, each of the plurality of modes has a different discrete current consumption. In other examples, the modes may be a stand-by mode, a low power mode, a standard performance mode, or a high performance mode. Other examples are possible.

In others of these embodiments, an application specific integrated circuit (ASIC) is used with an acoustic device. An input clock signal is received. The frequency of the input clock signal is determined, and the frequency is indicative of one of a plurality of operational modes of the ASIC. Based upon the determined frequency, an amount of current provided to one or more operational blocks of the ASIC is changed or adjusted.

Referring now to FIG. 1, a system 100 that uses a microphone 102 having a VAD algorithm and includes power savings features is described. The microphone 102 may in one example, include a MEMS chip (with MEMS die, diaphragm, and charge plate) and an application specific integrated circuit (ASIC). The system also includes a host 104. The host 104 may include various processing functions and may be part of a device (e.g., a personal computer or cellular phone, mobile handset, or tablet) where the microphone 102 resides.

A VDD power signal 112 and a ground signal 114 are coupled to the microphone 102. An interrupt signal 108 and a data signal 110 are sent from the microphone 102 to the host 104. A clock signal 106 is sent from the host 104 to the microphone 102.

In one example of the operation of the system 100 of FIG. 1, the microphone 102 has several modes of operation and these are controlled by the clock signal 106. The host 104 receives the data signal 110 from the microphone 102 as well as an interrupt signal 108. The host 104 has multiple power modes controlled by the interrupt signal 108 that is generated by the microphone 102 upon the detection of voice activity or a particular voice event (e.g., a specific spoken word). The host 104 generates the clock signal 106 for the microphone 102 and thereby controls the mode of operation of the microphone 102.

In one example, the microphone 102 includes a VAD mode of operation. In this mode, the microphone 102 has a very low power consumption, and it runs on a relatively low clock frequency which can be supplied either externally (from the clock signal 106 supplied by the host 104) or from an internal on-chip oscillator in the microphone 102. Consequently, when an interrupt is made, the low power operation can be changed to a higher powered mode of operation.

As will be recognized, the interrupt allows the system to be operated in both a low power mode of operation and a high power mode of operation.

In some aspects, the integrated circuit and the MEMS circuit receive a clock signal from an external host. The clock signal is effective to cause the MEMS circuit and integrated circuit to operate in full system operation mode during a first time period and in a voice activity mode of operation during a second time period. The voice activity mode has a first power consumption or level and the full system operation mode has a second power consumption or level. The first power consumption is less than the second power consumption. The integrated circuit is configured to generate an interrupt upon the detection of voice activity, and send the interrupt to the host. The absence of a clock causes the microphone to enter a voice activity detection mode. The clock circuit may be located on the same chip as the other components or located externally.

In other aspects, the present approaches provide the ability to operate the internal clock at a third power consumption or level and thereafter generate an external data stream and clock to signal the system to operate at a fourth power consumption or level. The third power level is less than the fourth power level, and the fourth power level is less than the first power level.

In still other aspects, the external clock may be detected and this may be applied after the detection of voice activity. Then, the internal clock is synchronized to the external clock. Furthermore, the VAD signal processing is also synchronized to the external clock after synchronization.

In yet other aspects, the system may fall back to the internal clock for power savings at the first or second power level when the external clock is removed to reduce overall system power.

In another example, an external signal may be generated from the internal combination of the clock and the acoustic activity detection that acts as a signal and clock combination to signal the host to interrupt/wake up and recognize the voice signal. The bandwidth of the input signal after buffering may be in one example approximately 8 kHz. Other examples are possible. Data may be provided in PCM or PDM formats. Other examples of formats are possible.

Figure 2:
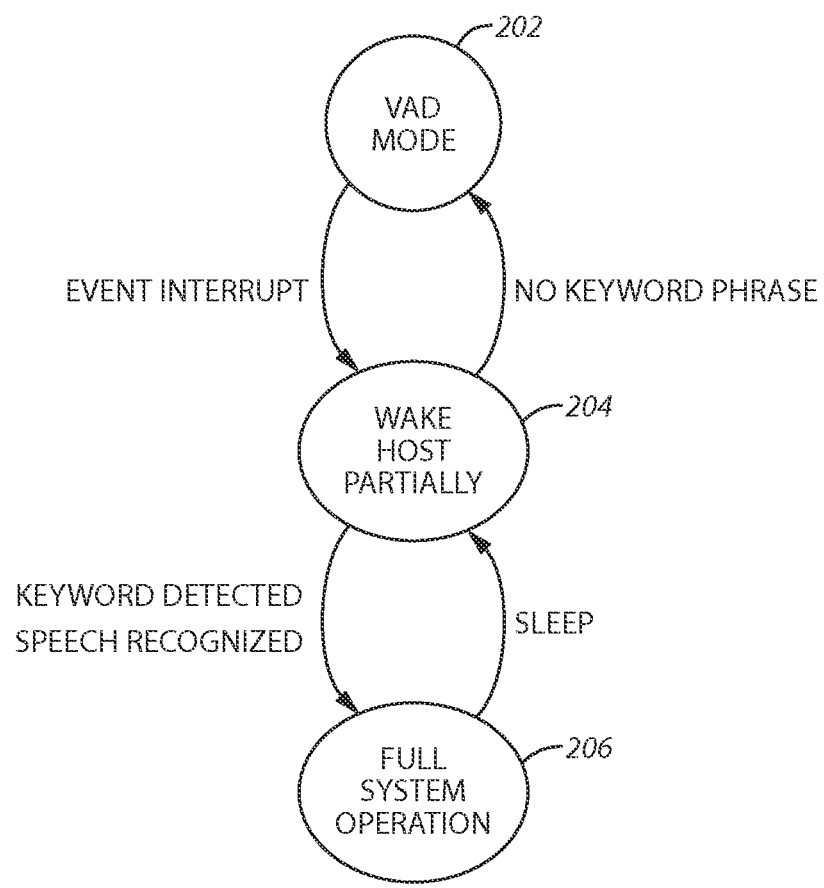
FIG. 2 comprises a diagram of the various states of a system that uses a microphone that uses a VAD algorithm and includes power savings features.

Referring now to FIG. 2 various operational states of a system that uses a microphone that uses a VAD algorithm is described. The approach of FIG. 2 has three modes of operation: a VAD mode 202, a wake up host (partially) mode 204, and a full system operation mode 206.

In the VAD mode 202, no data is transmitted out of the microphone. The host is sleeping in this mode. In one aspect, when the host is sleeping only the functionality needed to react to a generated interrupt signal from the microphone is enabled. In this mode, the host is clocked at a very low clock to lower power and all unnecessary functionality is powered down. This mode has the absolute lowest power consumption possible as all unnecessary blocks are powered down and no switching of clock or data signals occur. In other words, the mode 202 is a low power mode, where VAD is enabled and no external clock is being received from the host.

In the wake up host (partially) mode 204, the external clock is received from the host. Data is transmitted out of the microphone. The host becomes partially awake due to the detection of a keyword and/or the detection of voice activity. Subsequently, the external clock for the microphone is enabled with a clock frequency corresponding to a higher performance level enough for doing reliable keyword detection.

The full system operation mode 206 is the high power or standard operating mode of the microphone.

In one example of the operation of the state transition diagram of FIG. 2, the system begins in mode 202. The VAD algorithm detects an event which will trigger the transition from VAD mode 202 to partially wake up/wake up mode 204.

In the mode 204, the host detects a keyword/speech and decides that a specific key word, phrase, or sentence is recognized. This determination triggers the transition from the mode 204 to the full system wake up 206.

In the mode 206, the host keyword detect/speech recognition algorithm decides that no key word, phrase, or sentence is recognized which triggers the transition back to the VAD mode 202. In this respect, another mode or state (not shown here in FIG. 2) determines that the system should enter partially wake up/wake up mode 204 or go directly to the VAD mode 202.

Figure 3:
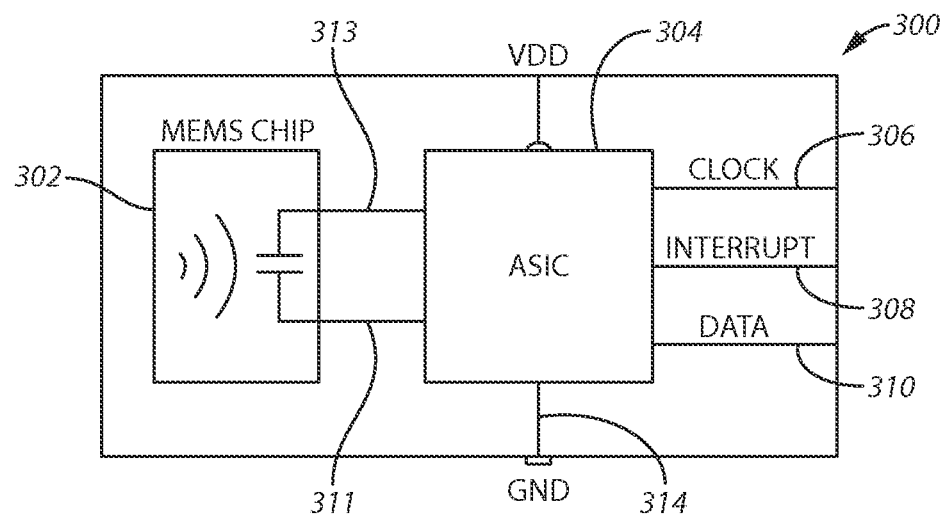
FIG. 3 comprises a block diagram of a microphone that uses a VAD algorithm and includes power savings features.

Referring now to FIG. 3, a microphone 300 that uses a VAD algorithm and includes power savings features is described. The microphone 300 includes a microphone chip or device 302. The microphone chip 302 includes a MEMS die, diaphragm, and charge plate. The system also includes an ASIC 304. The ASIC 304 may include various processing functions. The MEMS chip 302 receives a charge pump signal 315 from the ASIC 304 to power the MEMS chip 302.

A VDD power signal 312 and a ground signal 314 are coupled to the ASIC 304. An interrupt signal 308 and a data signal 310 are sent by the ASIC 304 to a host (e.g., the host 104 of FIG. 1). A clock signal 306 sent from the host is received by the ASIC 304.

In one example of the operation of the microphone 300 of FIG. 3, the microphone 300 has several modes of operation and these are controlled by the clock signal 306. A voice signal is received by the MEMS chip 302 and this sound is converted into an electrical signal and sent over data lead 311 to the ASIC 304. The ASIC 304 processes the signal into a data signal and then transmits the data signal 310 from the ASIC 304 as well as creating an interrupt signal 308. The host (e.g., the host 104 of FIG. 1) generates the clock signal 306 and this controls the mode of operation of the microphone 300.

In one example, the microphone 300 includes a VAD mode of operation. In this mode, the microphone 300 has a very low power consumption, and it runs on a relatively low clock frequency which can be supplied either externally (from the clock signal 306 supplied by the host) or from an internal on-chip oscillator in the microphone 300. Consequently, when an interrupt is made, the low power operation can be changed to a higher powered operation. The interrupt allows the system to be operated in both a low power mode of operation and a high power mode of operation.

Figure 4:
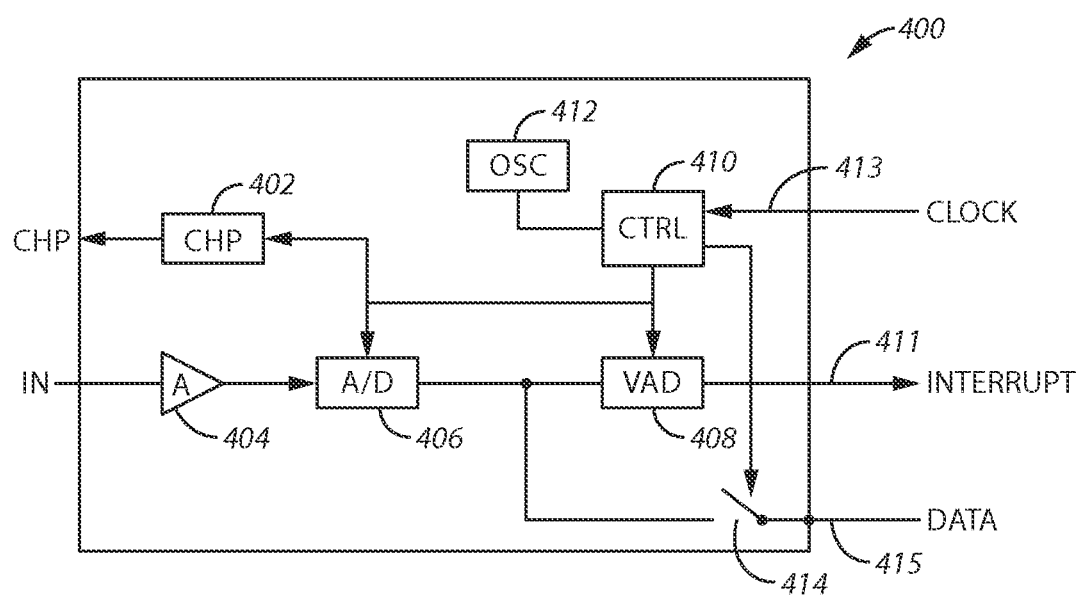
FIG. 4 comprises a block diagram of an application specific integrated circuit (ASIC).

Referring now FIG. 4, a block diagram of an application specific integrated circuit (ASIC) 400 is described. The ASIC 400 includes a charge pump (CHP) 402, an amplifier 404, an analog-to-digital converter 406, a voice activity detector (VAD) 408, a control block 410 (with oscillator 412), and a switch 414.

The charge pump CHP 402 charges the MEMS element (e.g., the MEMS chip 302 of FIG. 3) to convert changes in capacitance to voltage. The amplifier 404 buffers the electrical signal of the MEMS element (e.g., the MEMS chip 302 of FIG. 3) and subsequently amplifies the signal with a gain of A.

The A/D converter 406 converts the analog signal from the amplifier 404 to a digital signal. The VAD 408 processes the digital signal from the A/D converter 406 and generates an interrupt signal 411 if voice is detected. The control block 410 controls the internal states of the ASIC 400 in response to an external clock signal 413 (received from a host) and the interrupt signal 411 from the VAD 408. The switch 414 is controlled by the control block 410 to allow data 415 to be sent to an external host.

A data buffer may be included at the output of the A/D converter 406. The buffer may buffer data representing the audio signal and correspond to or approximate the delay of the VAD 408 (e.g., 10 ms-360 ms to mention one example range with other ranges being possible). A decimation filter stage could be included at the output of the A/D converter in order to reduce buffer size (sampler RAM) and power, this will limit the bandwidth. In this case an interpolation stage at the buffer output must be added as well. In this case, the delay may be around 200 msec. In another example, the delay may be around 360 msec. Other examples of delay values are possible. The buffer is provided to allow any recognition algorithm the latency required to wake up the host, collect sufficient background noise statistics, and recognize the key phrase within the ambient noise.

The buffered data may be sent to the host via some connection such as the interrupt line 411 or the data line 415. If sending data via the data line 415, it may be sent at an increased clock rate compared to the sampling clock.

Additionally, the parameters or settings of the VAD 408 may be changed or controlled. For example, the reading or writing settings of registers and memory (both erasable and non-erasable) of the VAD 408 may be changed or controlled to, for example, account for various levels of background noise.

The functionality of the VAD 408 may be enhanced or changed. For example, voice or phrase detection may be used. Other functions may also be included.

Figure 5:
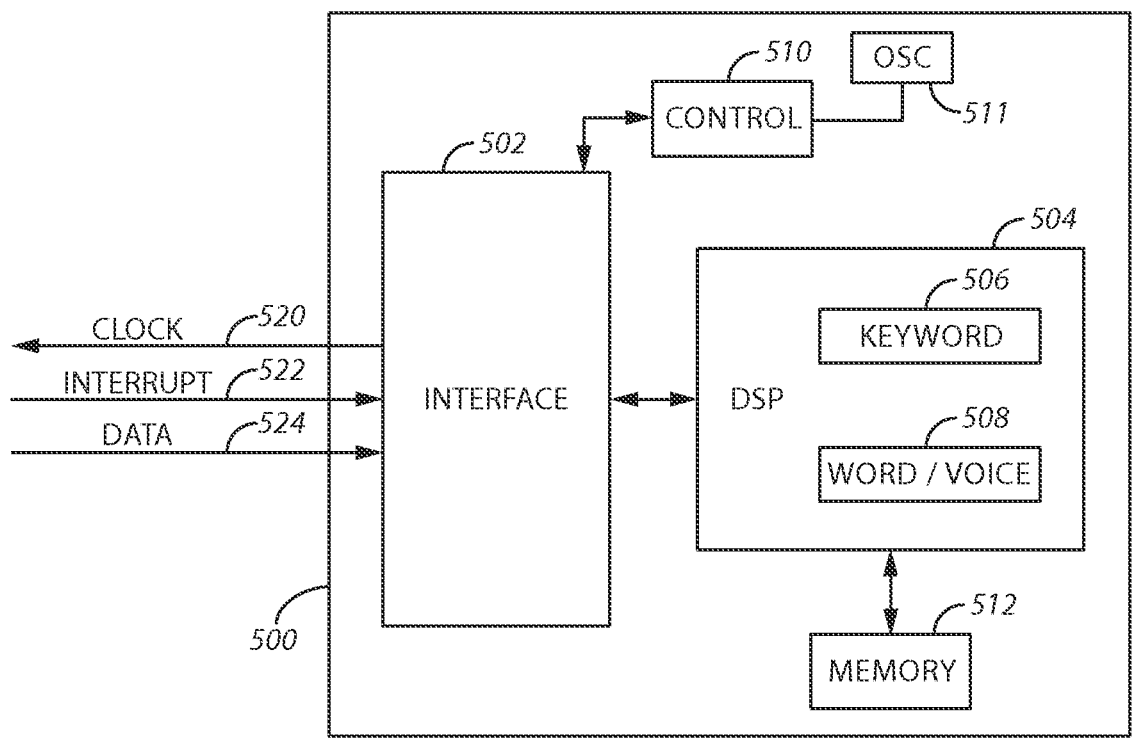
FIG. 5 comprises a block diagram of a host.

Referring now FIG. 5, a block diagram of host 500 is described. The host 500 includes an interface block 502, a digital signal processing (DSP) block 504 (including a keyword detection block 506 and word/voice recognition block 508), a control block 510 (clocked by an on-chip oscillator 511), and a memory 512.

The interface block 502 provides interfacing functionality with respect to a microphone (e.g., the microphone 102 in FIG. 1). The interface block transmits the clock signal 520 to the microphone and receives from the microphone an interrupt signal 522 and a data signal 524. The DSP block processes the data signal in two steps using the keyword detection block 506 (detecting a keyword) and the word/voice recognition block 508 (detecting a word or voice).

The control block 510 controls the power states of the microphone (e.g., the microphone 102 of FIG. 1), the blocks of the host 500, and the entire system including other blocks and functions outside the host and microphone (not shown here in FIG. 5).

The memory 512 stores the states of the system, data, and other information. The on chip oscillator 511 is controllable from the control block 510 and enables at least two clock modes corresponding to at least two power modes.

Figure 6:
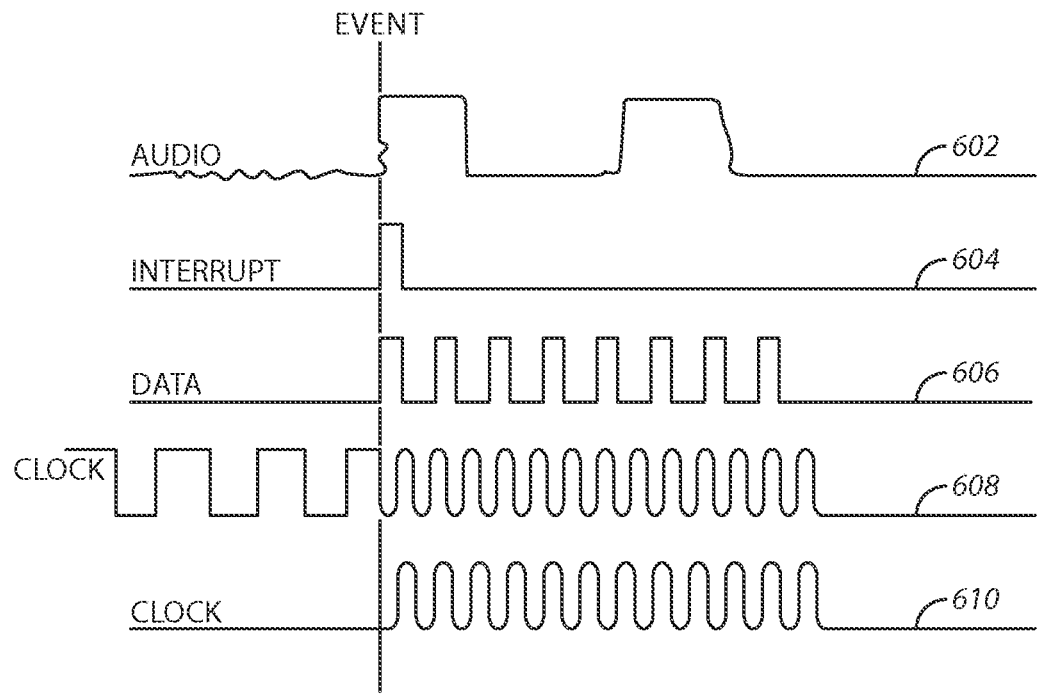
FIG. 6 comprises a timing diagram showing the operation of a microphone that uses a VAD algorithm and includes power savings features.

Referring now FIG. 6, a timing diagram showing the operation of a microphone that uses a VAD algorithm and includes power savings features is described. The signals of FIG. 6 show how the system and in particular how the microphone reacts to a voice/event signal and generates an interrupt signal. Subsequent to the interrupt signal, the diagrams show how the host reacts to the interrupt signal by changing its mode and afterwards changing the frequency of the clock signal to change the mode of the microphone.

Signal 602 shows an audio signal. Upon detection of an audio signal, the microphone generates an interrupt as shown by signal 604. Data is also generated by the microphone as shown by signal 606. As can be seen by signal 608, the host in response to the interrupt changes the clock signal (sent to the microphone) from a low frequency signal to a high frequency signal. Alternatively (as shown by signal 610), in low power mode (before the event), the host may not send a clock signal and may only start the high frequency clock signal upon detection of the event.

Figure 7:
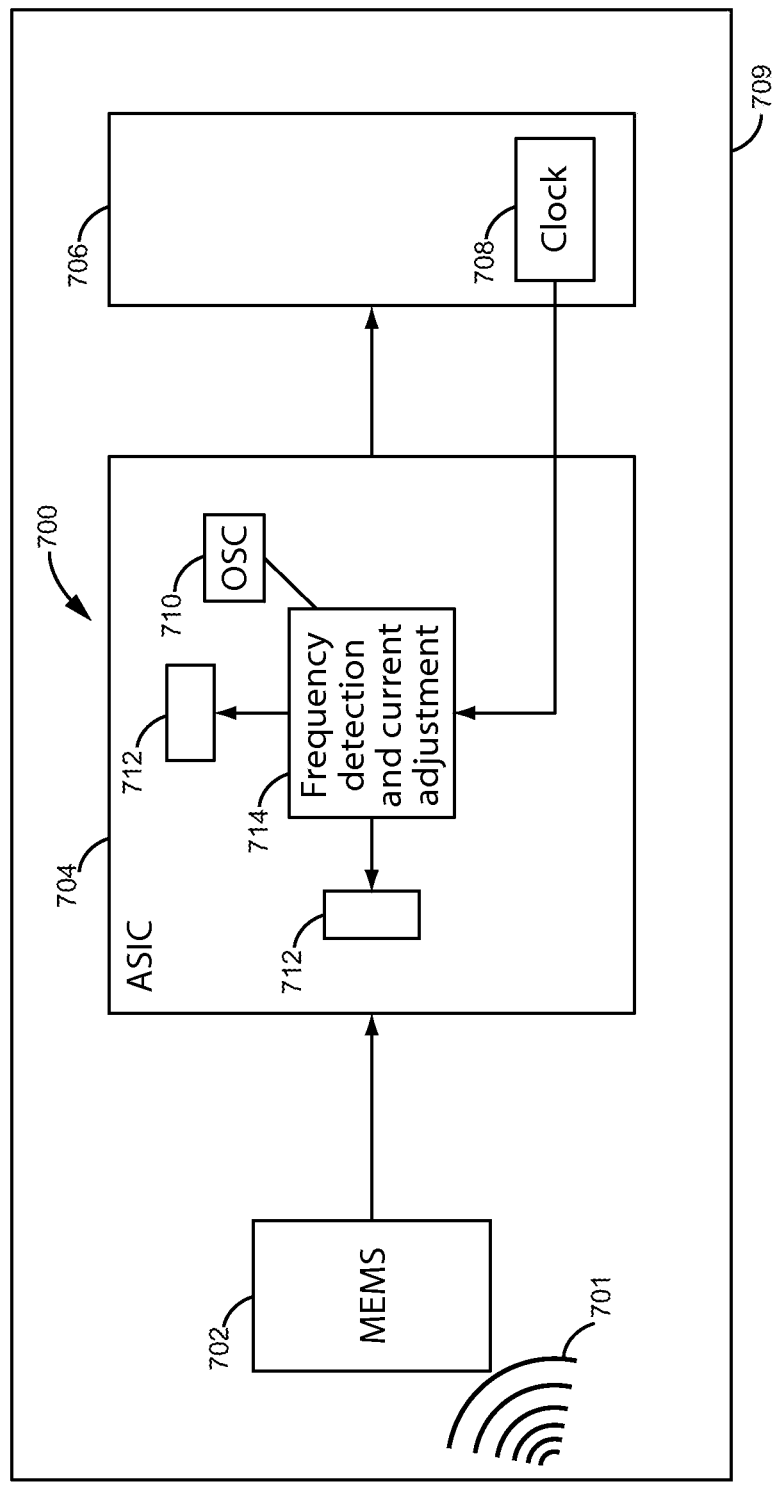
FIG. 7 comprises a block diagram of a system that uses frequency detection in a microphone.

Referring now to FIG. 7, one example of a microphone assembly 700 is described. The microphone assembly includes a MEMS device 702, and an application specific integrated circuit (ASIC) 704. The assembly couples to external circuitry 706 that is part of a host device 709. The host device may be a cellular phone, personal computer, or any other device that uses microphones. The circuitry of the host device is any type of electronic circuitry that performs any type of processing function. The circuitry may be divided into functional modules as appropriate and may be any combination of hardware and software elements (e.g., it may include microprocessors that execute programmed instructions). The host device circuitry 706 includes a clock 708 that is coupled to the ASIC 704 of the microphone assembly 700.

The MEMS device 702 is any type of MEMS microphone device (i.e., a transducer) that converts sound energy 701 into an analog electrical signal that is transmitted to the ASIC. The ASIC may be any type of integrated circuit that performs various types of functions such as buffering or amplification, among other functions described herein. The ASIC operates in various modes and each of these modes of operation utilizes or requires different power levels. If the power level is incorrect, the ASIC will either not operate or not operate properly. The ASIC processes the signal received from the MEMS device for use by the host device.

In FIG. 7, in order that the ASIC operate properly for a certain mode of operation, a frequency detection block 714 is configured to provide current adjustment based upon the received input frequency from the external clock 708 of the host device. In these regards, the frequency of the external clock represents the mode of operation of the ASIC and more generally the microphone assembly. The frequency of the external clock is compared by block 714 to an internally generated clock signal from an internal oscillator 710 on the ASIC. The frequency of the external clock is indicative of the operational mode of the ASIC. The comparison by block 714 allows for accurate detection of the frequency of the external clock 108. The current provided to different operational blocks 712 of the ASIC can be changed by block 714 based upon this detected frequency (which now has been measured accurately). In other words, the current consumption of the ASIC or portions thereof follows the frequency change of the external clock. Additional and/or different operation modes dependent on the frequency of the external clock are followed and their specific current and power needs are addressed because of the flexibility of changing the current.

The frequency detection aspects of the ASIC and particularly the operation of block 114 are described in further detail below with respect to FIG. 8 and FIG. 9.

Figure 8:
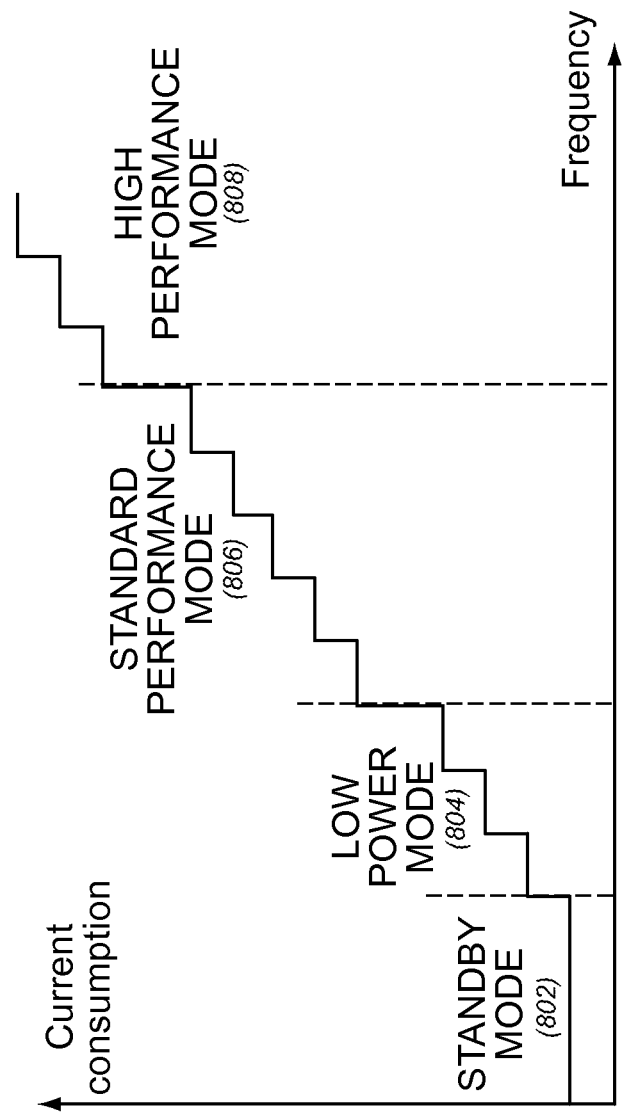
FIG. 8 comprises a chart showing operation of the frequency detection approaches.

In FIG. 8, the operation of the microphone is divided into four modes 802, 804, 806 and 808. It will be understood that fewer or additional numbers of modes can be defined based on the requirements from the ASIC including current consumption and noise. These modes have different discrete levels of current consumption as shown on the vertical axis and these current levels are adjusted according to the present approaches. It can be seen that these current levels change in discrete steps, rather than along a linear sloped pattern.

The standby mode 802 is where the current consumption is at a minimum, but the microphone is not functional. The low power mode 804 is where the current consumption is kept at a minimum but the microphone is functional with reduced performance. The standard performance mode 806 is where the current consumption is higher compared to the low power mode 804 and at the same time performance of the microphone is increased. The high performance mode 808 is where both the current consumption and the performance are at maximum.

In each mode, the current consumption is further increased (or decreased) and follows the detected frequency of the external clock. For instance, several clock driven circuits by nature require higher current consumption for higher clock frequency for a given performance or require higher current consumption for better noise performance. Examples of circuits needing varying power levels include analog-to-digital (A-to-D) converters and switch-capacitor filters, both of which are commonly used in digital microphones. Other examples are possible.

Figure 9:
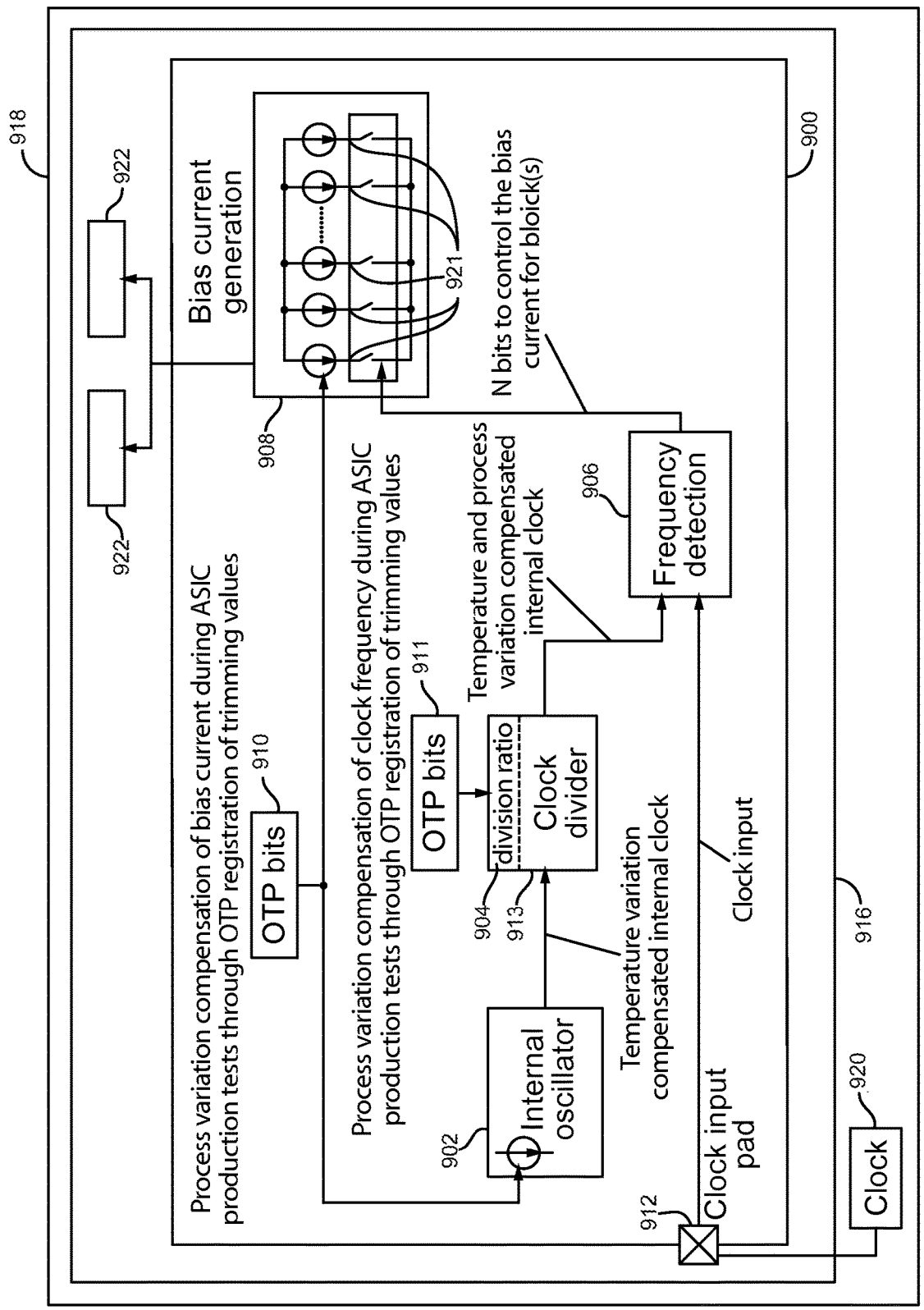
FIG. 9 comprises a block diagram of an integrated circuit (IC).

In FIG. 9, one example of a frequency detect and current adjustment block 900 (e.g., block 714 of FIG. 7) are described. In these regards, FIG. 9 illustrates one possible implementation about how to make bias current following the frequency of input clock independent of process, and temperature variations. Other examples are possible. The block 900 includes an internal oscillator 902, a clock divider 904, a frequency detection device 906, a bias current generator 908, one-time programmable (OTP) memory bits 910 and 911, and a clock input pad 912 that couples to the frequency detection device 906. The block 900 may be disposed on an ASIC 916. The ASIC may be disposed in a device 918 that includes a clock 920, which is coupled to the clock input pad 912. The device 918 may be a cellular phone or personal computer to mention two examples.

In operation, the internal oscillator 902 outputs a signal received by the clock divider 904. The OTP bits 910 may be used to compensate for process variations during the manufacturing process. For example, the oscillator frequency may be measured, compared to what is desired, and the bits applied to make the oscillator operate at the desired frequency. The output of the oscillator 902 is a temperature compensated clock signal. OTP bits 911 are applied to the clock divider 904 in the form of a division ratio 913 to compensate for various tolerances amongst oscillators/ASICs. This may occur during manufacturing where the division ratio is changed based upon the particular oscillators/ASIC. The output of the divider 904 is a temperature and process compensated clock signal. In other words, the output of the divider 904 can be considered an accurate clock since both temperature and process have been considered and compensation was made to the clock signal based upon these factors.

The frequency detection device 906 compares the input clock (from the device 918) to the accurate clock to find out the frequency of the input clock. It sends an n-bit control signal to the bias current generator 908. The bias current generator 908 may also be adjusted by the OTP bits during manufacturing to compensate for process variations. The n-bits are a digital bit representation of the input clock frequency. For example, if the digital representation is 1, frequency may be 100 Khz, if it is 2, frequency may be between 100 kHz and 200 kHz, and so forth. This n-bit signal activates various ones of the switches 921 within the generator 908. The more switches 912 that are closed, the more current that is supplied. In this way, the current is adjusted based upon the frequency (which represents mode) of the clock 920. The current from 908 may flow to different blocks 922 of the ASIC, thereby operating the ASIC as needed. As can be seen in FIG. 8, the approaches utilized in FIG. 9 result in a stepped current response, rather than a linear progression.

Accordingly, the present approaches provide digital microphone that operate in multiple modes with different performance aspects including current consumption and noise. Changes in performance aspects are controlled through the change in the clock input frequency. Detection of change in the clock input frequency is done by comparing the clock input to an internally generated accurate clock source from an oscillator on the ASIC. The internally generated clock signals (on the ASIC) run independently of both temperature and process. Temperature independency can be achieved by using process independent current source in the oscillator. Process independency can be achieved by using OTP registration of process variation compensation during ASIC production tests.

In some embodiments, a microphone apparatus includes an acoustic sensor configured to produce an electrical signal at an output of the acoustic sensor in response to sensing an acoustic signal; an electrical circuit including an acoustic activity detector, a frequency detection circuit and a control block, the electrical circuit having an input coupled to the output of the acoustic sensor, the electrical circuit configured to process the electrical signal; an internal clock signal generator coupled to the electrical circuit; and a host interface with external connections coupled to the electrical circuit, the external connections including a connection for an external clock signal and data, the external clock signal connection coupled to the frequency detection circuit. The microphone assembly has an acoustic activity detection mode of operation when the electrical circuit is clocked using the internal clock signal generator in the absence of an external clock signal at the host interface, and the electrical circuit is configured to provide an interrupt signal to the host interface upon detection of acoustic activity by the electrical circuit. The electrical circuit is configured to control the operating mode of the microphone assembly based on a frequency of an external clock signal received at the host interface in response to providing the interrupt signal. The electrical circuit is configured to provide data representing the electrical signal to the host interface using the external clock signal received at the host interface.

In some embodiments, a microphone apparatus includes an acoustic sensor; an electrical circuit having an input coupled to an output of the acoustic sensor, the electrical circuit including an acoustic activity detector and a frequency determination circuit; an internal clock signal generator coupled to the electrical circuit; and a host interface with external connections coupled to the electrical circuit, the host interface including a connection for an external clock signal and data. The acoustic activity detector is configured to process, in an acoustic activity detection mode, data representing an electrical signal output by the acoustic sensor for acoustic activity when the electrical circuit is clocked by a clock signal of the internal clock signal generator in the absence of an external clock signal on the host interface. The electrical circuit is configured to provide an interrupt signal to the host interface after detection of acoustic activity, and the electrical circuit is configured to control an operating mode of the microphone assembly based on a frequency of an external clock signal received at the host interface in response to the interrupt signal. The electrical circuit is configured to provide data representing the electrical signal to the host interface using the external clock signal received at the host interface.

Preferred embodiments of this disclosure are described herein, including the best mode known to the inventors. It should be understood that the illustrated embodiments are exemplary only, and should not be taken as limiting the scope of the appended claims.

What is claimed is:

1. A microphone assembly comprising:
   an acoustic sensor configured to produce an electrical signal at an output of the acoustic sensor in response to sensing an acoustic signal;
   an electrical circuit having an input coupled to the output of the acoustic sensor and configured to process the electrical signal to generate a microphone output signal; and
   an internal clock signal generator coupled to the electrical circuit;
   wherein in a voice activity detection mode of operation the microphone assembly is clocked using the internal clock signal generator, and wherein the electrical circuit is configured to switch the microphone assembly to a second mode of operation based on an external clock signal received at a host interface of the microphone assembly in response to an interrupt signal generated by the electrical circuit upon detecting voice activity.

2. A microphone assembly comprising:
   an acoustic sensor configured to produce an electrical signal at an output of the acoustic sensor in response to sensing an acoustic signal;
   an electrical circuit including an acoustic activity detector, a frequency detection circuit and a control block, the electrical circuit having an input coupled to the output of the acoustic sensor, the electrical circuit configured to process the electrical signal;
   an internal clock signal generator coupled to the electrical circuit; and
   a host interface with external connections coupled to the electrical circuit, the external connections including a connection for an external clock signal and a connection for data, the external clock signal connection coupled to the frequency detection circuit;
   the microphone assembly having an acoustic activity detection mode of operation when the electrical circuit is clocked using the internal clock signal generator in absence of an external clock signal at the host interface, the electrical circuit configured to provide an interrupt signal to the host interface upon detection of acoustic activity by the electrical circuit,
   the electrical circuit configured to control the operating mode of the microphone assembly based on a frequency of an external clock signal received at the host interface in response to providing the interrupt signal,
   wherein the electrical circuit is configured to provide data representing the electrical signal to the host interface using the external clock signal received at the host interface.

3. The microphone assembly of claim 2, the electrical circuit including a bias current generator configured to control current provided to the electrical circuit based on the determined frequency, wherein the operating mode is based on current provided to the control block.

4. The microphone assembly of claim 3, the frequency detection circuit including a comparator coupled to the external clock signal connection and to an output of the internal clock signal generator, wherein the frequency detection circuit determines the frequency of the external clock signal based on a comparison of the external clock signal and a clock signal of the internal clock signal generator.

5. The microphone assembly of claim 4, the internal clock signal generator including a programmable divider circuit coupled to an internal oscillator, wherein the internal clock signal generator is configured to output a process compensated internal clock signal based on data input to the programmable divider circuit.

6. The microphone assembly of claim 5, the electrical circuit including a data buffer, wherein the electrical circuit is configured to buffer data representing the electrical signal in the data buffer during the acoustic activity detection mode of operation and the electrical circuit is configured to provide the buffered data to the host interface after the interrupt signal is provided to the host interface.

7. The microphone assembly of claim 6, the electrical circuit including an analog-to-digital converter having an input coupled to the output of the acoustic sensor, the analog-to-digital converter having an output coupled to the acoustic activity detector and to the data buffer.

8. The microphone assembly of claim 7, the acoustic sensor is a microelectromechanical systems (MEMS) transducer and the electrical circuit is an integrated circuit.

9. The microphone assembly of claim 7, the acoustic sensor is a capacitive microelectromechanical systems (MEMS) device and the electrical circuit includes a charge pump having a bias signal output coupled to the capacitive MEMS device.

10. The microphone assembly of claim 6, wherein the electrical circuit is overclocked to catch up buffered data provided to the host interface with real time data.

11. The microphone assembly of claim 6, the acoustic activity detection mode of operation has lower power consumption than other operating modes controlled by the external clock signal.

12. The microphone assembly of claim 6, the electrical circuit configured to provide buffered data to the host interface using the external clock signal received at the host interface.

13. The microphone assembly of claim 3, the electrical circuit including a data buffer, wherein the electrical circuit is configured to buffer data representing the electrical signal in the data buffer during the acoustic activity detection mode of operation and the electrical circuit is configured to provide the buffered data to the host interface after the interrupt signal is provided to the host interface.

14. The microphone assembly of claim 13, wherein the electrical circuit is overclocked to catch up buffered data provided to the host interface to real time.

15. A microphone assembly comprising:
   an acoustic sensor;
   an electrical circuit having an input coupled to an output of the acoustic sensor, the electrical circuit including an acoustic activity detector and a frequency determination circuit;
   an internal clock signal generator coupled to the electrical circuit;
   a host interface with external connections coupled to the electrical circuit, the host interface including a connection for an external clock signal and a connection for data;
   the acoustic activity detector configured to process, in an acoustic activity detection mode, data representing an electrical signal output by the acoustic sensor for acoustic activity when the electrical circuit is clocked by a clock signal of the internal clock signal generator in absence of an external clock signal on the host interface, the electrical circuit configured to provide an interrupt signal to the host interface after detection of acoustic activity, and the electrical circuit configured to control an operating mode of the microphone assembly based on a frequency of an external clock signal received at the host interface in response to the interrupt signal, wherein the electrical circuit is configured to provide data representing the electrical signal to the host interface using the external clock signal received at the host interface.

16. The microphone assembly of claim 15, the electrical circuit including a data buffer, the electrical circuit configured to buffer data representing the electrical signal in the data buffer during acoustic activity detection mode processing, and the electrical circuit configured to provide the buffered data to the host interface after the interrupt signal is provided to the host interface.

17. The microphone assembly of claim 16, the electrical circuit including a bias current generator configured to control a current provided to the electrical circuit based on the determined frequency, wherein the operating mode of the microphone assembly is based on the current provided to the electrical circuit.

18. The microphone assembly of claim 17, the frequency determination circuit including a comparator coupled to the connection for the external clock signal and to the internal clock signal generator, wherein the frequency of the external clock signal is determined based on a comparison of the external clock signal and the clock signal of the internal clock signal generator.

19. The microphone assembly of claim 15, wherein the acoustic activity detection mode of operation has lower power consumption than the operating mode controlled by the external clock signal.

20. The microphone assembly of claim 15, wherein the electrical circuit is overclocked to catch up buffered data provided to the host interface with real time data.

* * * * *